(12) United States Patent
Smith et al.

(10) Patent No.: US 10,389,756 B2
(45) Date of Patent: Aug. 20, 2019

(54) SYSTEM, APPARATUS AND METHOD FOR SECURITY INTEROPERABILITY PATH ANALYSIS IN AN INTERNET OF THINGS (IOT) NETWORK

(71) Applicant: Intel Corporation, Santa Clara, CA (US)

(72) Inventors: Ned M. Smith, Beaverton, OR (US); Rajesh Poornachandran, Portland, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 15/045,676

(22) Filed: Feb. 17, 2016

(65) Prior Publication Data

US 2016/0366181 A1  Dec. 15, 2016

Related U.S. Application Data

(60) Provisional application No. 61/172,956, filed on Jun. 9, 2015.

(51) Int. Cl.
*H04L 29/06* (2006.01)
*G06F 21/57* (2013.01)
*G06F 21/62* (2013.01)

(52) U.S. Cl.
CPC ............ *H04L 63/20* (2013.01); *G06F 21/57* (2013.01); *G06F 21/6236* (2013.01); *H04L 63/102* (2013.01); *H04L 63/1425* (2013.01)

(58) Field of Classification Search
CPC ... H04L 63/20; H04L 63/102; H04L 63/1425; G06F 21/6236; G06F 21/57
See application file for complete search history.

(56) References Cited

U.S. PATENT DOCUMENTS 9,094,407 B1 * 7/2015 Matthieu ................. H04W 4/70
2013/0148566 A1 * 6/2013 Doppler ............... H04W 72/005
370/312

(Continued)

OTHER PUBLICATIONS

AllSeen Alliance "Introduction to the AllJoyn Framework" Dec. 10, 2013 (30 pages) https://people.eecs.berkeley.edu/~johnw/cs294-97/papers/intro_alljoyn_framework.pdf (Year: 2013).*

(Continued)

*Primary Examiner* — Joseph P Hirl
*Assistant Examiner* — Thomas A Gyorfi
(74) *Attorney, Agent, or Firm* — Trop, Pruner & Hu, P.C.

(57) ABSTRACT

In one embodiment, an apparatus comprises a first logic to receive security attribute information from a plurality of devices, generate a connectivity graph of the plurality of devices based at least in part on the security attribute information and identify an interoperability issue between a first device and a second device based on the connectivity graph. The apparatus may further include a second logic to generate a recommendation to resolve the interoperability issue and a third logic to provide provisioning information to at least one of the first device and the second device based on the recommendation. Other embodiments are described and claimed.

22 Claims, 9 Drawing Sheets

(56) References Cited

U.S. PATENT DOCUMENTS

| | | | | |
|---|---|---|---|---|
| 2013/0278622 | A1* | 10/2013 | Sun | G06Q 20/22 345/589 |
| 2016/0249286 | A1* | 8/2016 | Chen | H04W 48/20 |
| 2016/0338121 | A1* | 11/2016 | Wietfeldt | H04L 67/104 |
| 2017/0272948 | A1* | 9/2017 | Holtmanns | H04B 1/70735 |

OTHER PUBLICATIONS

Marcello Lioy. "The AllJoyn Open Source Project" (C)2012 Qualcomm Innovation Center (25 pages) https://events.static.linuxfound.org/images/stories/pdf/lf_abs12_lioy.pdf (Year: 2012).*

Marcello Lioy. "Peer-to-Peer Technology: Driving Innovative User Experiences in Mobile" (C)2011 Qualcomm Innovation Center Ince. (29 pages) http://assets.en.oreilly.com/1/event/61/Peer-to-Peer%20Technology_%20Driving%20Innovative%20User%20Experiences%20in%20Mobile%20Presentation.pdf (Year: 2011).*

Wikipedia, "OSI Model", https://en.wikipedia.org/wiki/OSI_model#Layer_4:_Transport_Layer, Jun. 8, 2015, 7 pages.

Wikipedia, "Key Management", https://en.wikipedia.org/wiki/Key_management, May 19, 2015, 5 pages.

Wikipedia, "Publish—Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wiki/XMPP, May 22, 2015, 7 pages.

IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.

openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.

openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.

U.S. Appl. No. 14/864,957, filed Sep. 25, 2015, entitled "System, Apparatus and Method for Managing Lifecycle of Secure Publish-Subscribe System" by Ned M. Smith, et al.

U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 62/172,962, filed Jun. 9, 2015, entitled "Providing Protected Content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" Ned M. Smith, et al.

U.S. Appl. No. 14/976,165, filed Dec. 21, 2015, entitled "System, Apparatus and Method for Migrating a Device Having a Platform Group" by Ned M. Smith, et al.

U.S. Appl. No. 14/977,742, filed Dec. 22, 2015, entitled "System, Apparatus and Method for Safety State Management of Internet Things (IoT) Devices" by Ned M. Smith, et al.

Wikipedia, "Tor", https://en.wikipedia.org/wiki/Tor_%28anonymity_network%29 , Jun. 4, 2015, 14 pages.

Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

\* cited by examiner

SYSTEM, APPARATUS AND METHOD FOR SECURITY INTEROPERABILITY PATH ANALYSIS IN AN INTERNET OF THINGS (IOT) NETWORK

This application claims priority to U.S. Provisional Patent Application No. 62/172,956, filed on Jun. 9, 2015, in the names of Ned M. Smith, Rajesh Poornachandran, and Nathan Heldt-Sheller, entitled SECURITY INTEROPERABILITY PATH ANALYSIS IN AN IOT NETWORK, the disclosure of which is hereby incorporated by reference.

BACKGROUND

One challenge in Internet of Things (IoT) networks is consistent security capabilities across a heterogeneous IoT network. IoT devices typically have security capabilities represented in various layers including security resources in the application layer, channel encryption in a session layer, multi-cast, broadcast and unicast encryption in the transport layer, algorithm types, key types and data structure encoding schemes such as distinguished encoding rules (DER), basic encoding rules (BER), concise binary object representation (CBOR), JavaScript object notation (JSON), extensible markup language (XML), etc. All these parameters and more affect security interoperability outcomes.

In IoT frameworks such as in a framework of the Open Interconnect Consortium (OIC), messages and resources may be exchanged between devices when all of the conditions of security interoperability are met. While consortiums and interoperability testing events may use industry standards to agree on interoperability requirements, areas of ambiguity nevertheless remain. For example, for a device to communicate with a less capable device a certain set of application layer, session layer or transport layer resources and protocols may be required, while for a second device a different set of these items may be required.

IoT devices are often implemented in constrained environments with limited memory, storage and compute power. Device manufacturers often remove as much functionality as possible to reduce cost, resulting in devices that may only be accessed using the choices prescribed at manufacturing. Still other less constrained devices may include more features to broaden connectivity options. Therefore, even standards-compliant IoT systems may have areas of interoperability gaps, including security interoperability gaps.

DETAILED DESCRIPTION

In various embodiments, one or more controllers within an IoT network may be provided to analyze information regarding interoperability on a security basis between devices within the IoT network. As will be described herein, such controller(s) may be centralized or distributed throughout the IoT network. Based on analyzing security attribute information of the various IoT devices if an interoperability issue is identified between IoT devices, such controller(s) may be configured to determine whether a security appropriate mediation of one or more of the IoT devices is possible to enable interoperability between such IoT devices according to security requirements of the devices. To this end, such controller(s) may be configured to provide recommendations, instructions and/or provisioning information to one or more of these IoT devices when such update/reconfiguration/provisioning is possible. Otherwise, the controller(s) may be configured to isolate IoT devices from each other that are not interoperable on a security basis.

Figure 1:
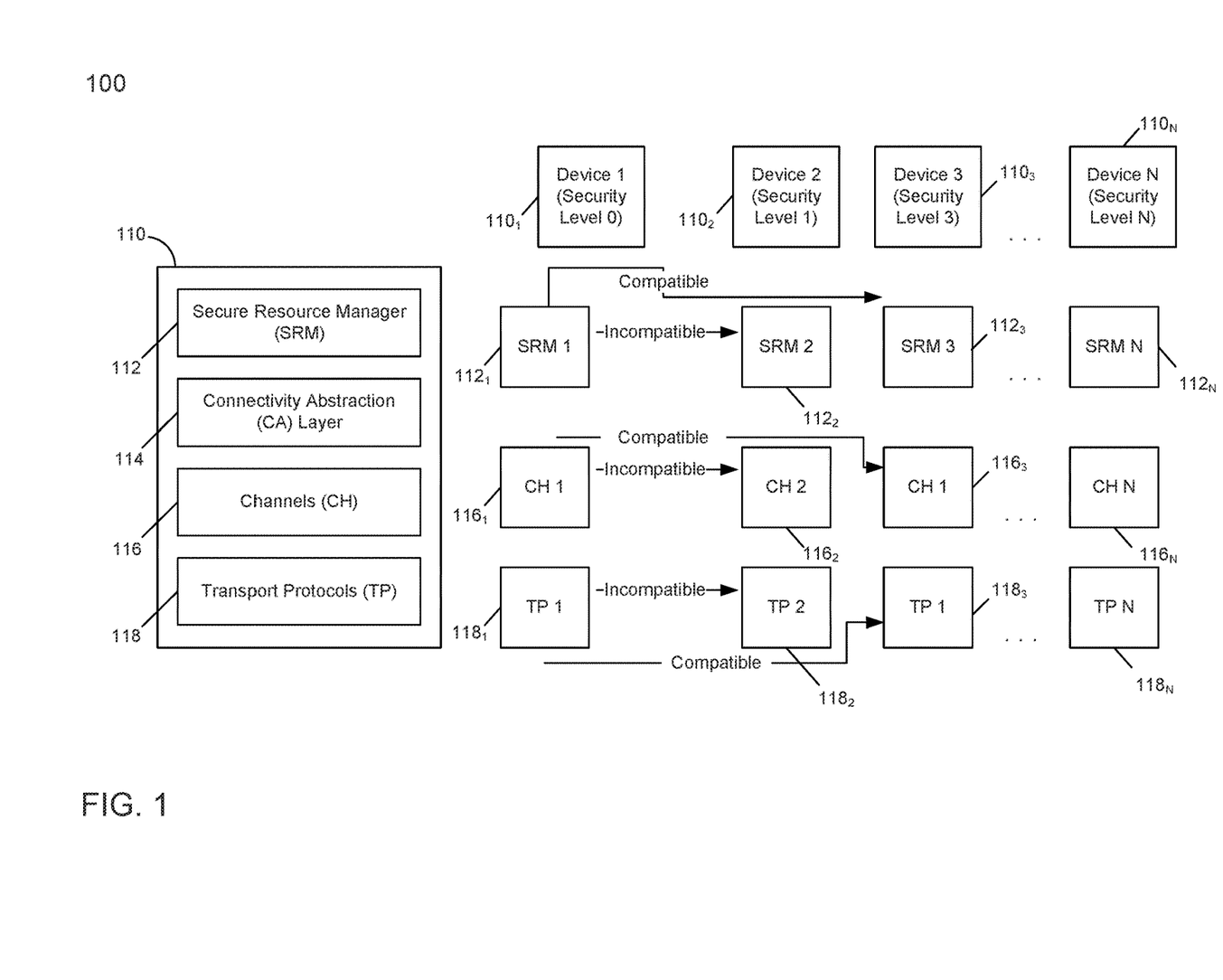
FIG. 1 is a block diagram of an IoT network.

Referring now to FIG. 1, shown is a block diagram of a collection of IoT devices 100, which may be present in a given IoT network context. IoT network 100 may be a given collection of IoT devices 110 ranging from relatively computationally constrained devices to more computationally complex devices. As examples, these IoT devices may range from sensors, actuators, controllers, and so forth, to portable devices, embedded systems and other types of computing devices. Devices 110 may include a wide variety of different computing, sensing, actuation and other hardware devices. At a minimum, each device 110 may include some type of processing component such as a central processing unit (CPU), system on chip (SoC), embedded controller, microcontroller or so forth, one or more non-transitory memories and/or storage, in addition to communication hardware, and possibly sensing hardware, actuation hardware, interface hardware and so forth. More specifically, IoT devices 110 may include at least minimal computing capabilities. In at least some embodiments, a given processor or SoC (or portion thereof) may include separate secure circuitry (or may be configured) to operate in a secure mode. Such secure mode provides a trusted execution environment (TEE) for the device that is isolated from non-secure hardware/software/firmware. In example embodiments, a TEE of the device may leverage Intel® Software Guard Extensions (SGX), Intel® MemCore, Intel® Converged Security Engine (CSE), Intel® virtualization technology (VT-X), Intel® IOT-OS with Smack, ARM TrustZone, among other secure environments. In some cases, the TEE may be implemented in a secure co-processor or hardware security module. Details of representative IoT devices with which embodiments may be used will be described further below.

In any event, each IoT device 110 may include a secure resource manager (SRM) 112, which may be implemented as a combination of hardware, software, and/or firmware to handle security functions on behalf of the device. In turn, SRM 112 may be communicatively coupled to a connectivity abstraction (CA) layer 114, which may provide an abstraction, virtualization and/or containerization of connectivity functions of the device. In particular, CA layer 114 may abstract the underlying hardware used for communication. Such hardware may include one or more channels (CH) 116. Each such channel may be associated with a combination of hardware, software and firmware to enable communication via a given communication channel, such as a wide variety of wired and/or wireless communication channels. In turn, channels 116 may communicate information according to one or more transport protocol (TPs) 118.

FIG. 1 shows an example scenario wherein N IoT devices $110_1$-$110_n$ would like to exchange secure data. Based on the security capabilities (secure boot, trusted boot, etc.), these IoT devices are categorized under different security levels. Each IoT device 110 may have booted with certain security configuration/modules, but inter-IoT communication may require different security configuration/module. Each IoT device instance may provide support for a specific communication channel (e.g., Bluetooth) with a specific transport protocol associated therewith. For example, in the embodiment of FIG. 1, device $110_1$ supports channel $116_1$ (channel 1) with transport protocol $118_1$ (transport protocol 1), while device $110_2$ supports channel $116_2$ (channel 2), transport protocol $118_2$ (transport protocol 2). In this case SRM $112_1$ in IoT device $110_1$ cannot communicate with SRM $112_2$ in device $110_2$ due to this incompatibility. However, device $110_3$ supports channel $116_3$ (which is the same channel 1 as channel $116_1$), transport protocol $118_3$ (which is the same transport protocol 1 as transport protocol $118_1$), so it is compatible with device $110_1$, and thereby SRM $112_1$ can communicate with SRM $112_3$. Thus as seen, if any of the IoT device security attributes is misaligned, IoT devices 110 may not be able to connect or interoperate securely.

Embodiments are based around a concept of Software Defined Network Security Interoperability (SDNSI) in IoT networks, where an IoT network discovery capability is exploited to identify a rich set of device attributes affecting connectivity and interoperability. These attributes are analyzed to establish theoretical interoperability for a given set of IoT nodes. IoT discovery mechanisms rely on open multi-cast protocols or directory services that allow discovery of device attributes. Embodiments use discovery mechanisms to publish the set of security attributes affecting connectivity and interoperability, in addition to non-security related attributes that may also affect connectivity and interoperability.

In various embodiments, a security interoperability recommendation engine (SIRE) may access a plurality of IoT nodes within a IoT framework such as Open Interconnect Consortium (OIC), Alljoyn, Thread etc.-based frameworks, to observe discovery data and compare it to a given device's security attributes. In different embodiments, this SIRE may be a central agent or a distributed agent. Where multiple possible connectivity and interoperability options exist, the SIRE may evaluate relative security strength over each path. Depending on a given security policy, an objective may be present to require connectivity and interoperability using the more secure path.

A SIRE on a more capable IoT device may seek to analyze several or all devices available to discovery to establish a graph relating all nodes in the IoT network according to these criteria. The graph may reveal multiple layers of connectivity and interoperability, or it may reveal nodes and sub-graphs that are disjoint.

The analysis may be used to better optimize IoT network deployments to achieve a variety of objectives, including detection and removal of security downgrades (e.g., if connectivity across a node requires use of weaker cryptography). Other uses are informed by the analysis also, such as simulating effects of adding a new device. As one simulation example, it can be determined whether such device to be added to an IoT network may find a path to a sub-graph that is intended to be isolated.

Figure 2:
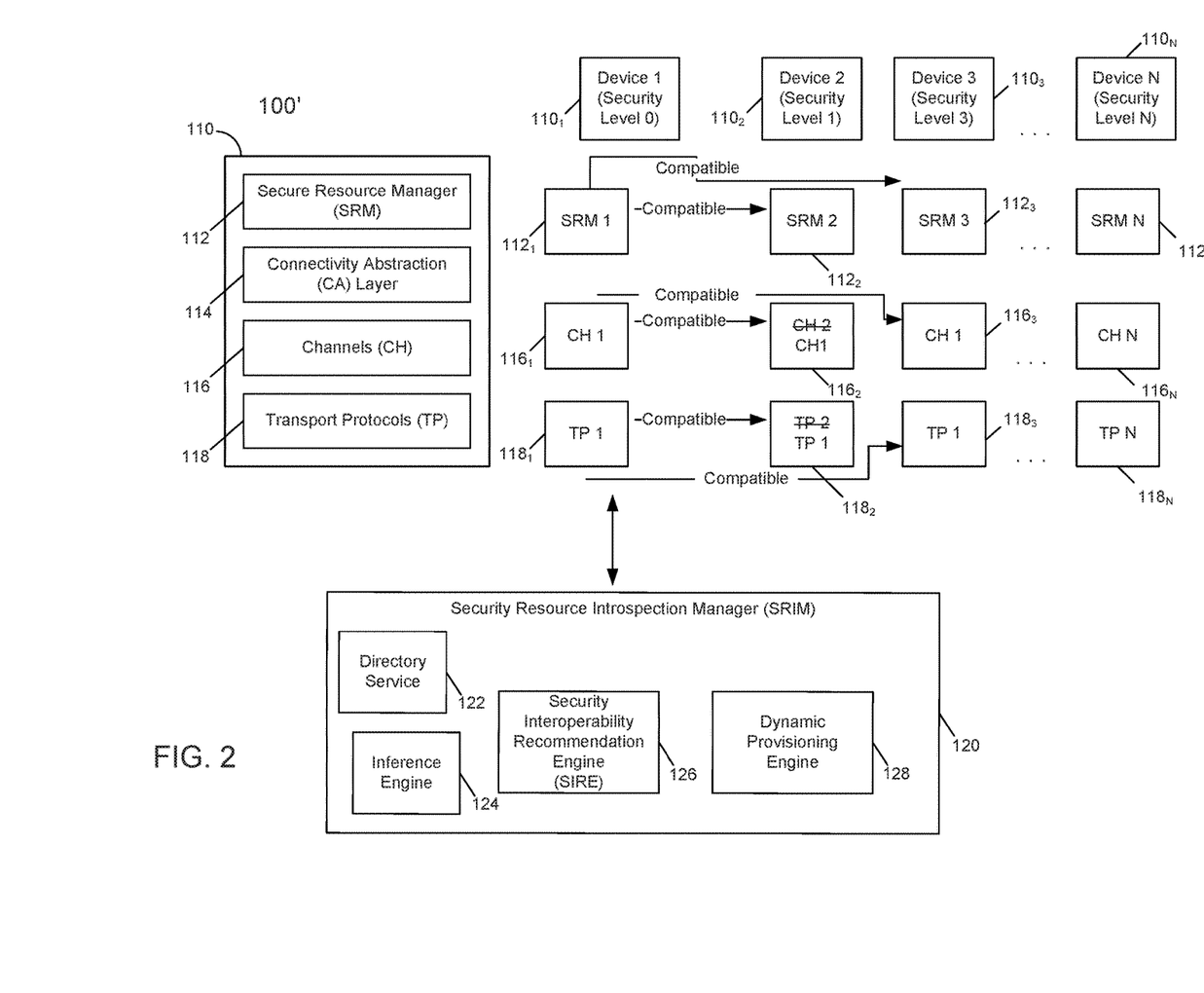
FIG. 2 is a block diagram of a network arrangement in accordance with an embodiment of the present invention.

Referring now to FIG. 2, shown is a block diagram of a network arrangement in accordance with an embodiment of the present invention. As shown in FIG. 2, network 100' may include a plurality of IoT devices $110_1$-$110_n$, as described above with regard to FIG. 1. In addition, in network 100' a security resource introspection manager (SRIM) 120 is present. In the embodiment of FIG. 2, SRIM 120 is implemented as a central controller or other smart agent of IoT network 100' to identify interoperability issues and bring up appropriate modules to resolve the issues. As such, SRIM 120 may be implemented as one or more server computers or other computing devices separate from IoT devices $110_1$-$110_n$. In other embodiments, SRIM 120 may be implemented in a distributed manner, such that the functionality performed by SRIM 120 may be implemented within and performed by some or all of IoT devices 110. In yet other embodiments, combinations of a central/distributed arrangement may occur.

As illustrated in the embodiment of FIG. 2, SRIM 120 includes various engines enumerated herein, which may be implemented as standalone hardware or combinations of hardware, software and/or firmware, such as different hardware logic modules to perform the various functionality. As illustrated, SRIM 120 includes a directory service 122. Directory service 122 may be configured to provide directory information regarding IoT devices 110 of network 100'. In an embodiment, directory service 122 may be configured to allow IoT devices to publish their secure/trusted boot path results to a directory management entity. In some embodiments, directory service 122 may be configured to communicate with an external directory database and/or service to obtain such directory information. In other cases, directory service 122 may query individual IoT devices 110 to obtain such directory information.

As will be described herein, each device 110 may provide device attribute information, which in turn may include security attribute information regarding the device's security capabilities. In addition, directory service 122 may further obtain information from devices 110 regarding execution of a secure/trusted boot flow of the devices. As an example, devices 110 may be configured to provide a trusted boot quote, such as a trust level via values stored in one or more platform configuration registers (PCRs) of the devices.

Still with reference to FIG. 2, SRIM 120 further includes an inference engine 124. Inference engine 124 may be configured to construct a topology graph, such as an inoperability and/or connectivity graph (generally "a connectivity graph") based on the device attribute information. From this constructed graph, inference engine 124 may identify interoperability gaps or issues between given devices 110, at least with regard to security interoperability. While a graph-based approach is described herein, understand the scope of the present invention is not limited in this regard and in other embodiments, other manners of determining interoperability issues such as networking protocols, data serialization methods, state transition diagrams, and schema definition languages may be used, instead of or in conjunction with a graph-based analysis.

Still with reference to FIG. 2, SRIM 120 further includes a security interoperability recommendation engine (SIRE) 126. In embodiments, SIRE 126 may provide recommendations on control, update and/or reconfiguration of security abstraction layer channels/protocols. That is, when an interoperability issue is identified, e.g., between two IoT devices (e.g., IoT devices $110_1$ and $110_2$), SIRE 126 may determine whether it is possible to find a common channel/transport protocol to enable interoperability to occur between these devices in accordance with given security requirements. In some cases such common channel/transport protocol may be native to both devices, while in other cases one or more devices may be reconfigured and/or provisioned to be provided with the common capability (where possible).

Embodiments may thus implement an IoT framework (such as an OIC) security layer having a SIRE that makes use of an IoT discovery mechanism to discover security attributes that may be platform specific, network specific, device specific and application specific. Then prior to an attempt to open a connection to a peer device, the local device SIRE module evaluates the security attributes of the local device and the security attributes of the target device to determine whether the local device can find a combination of security settings that allows access to the target device.

Security settings, which can be indicated in security attribute information, may include transport specific security capabilities (e.g., Internet protocol security (IPSEC)), session specific security (e.g., datagram transport layer security (DTLS)), and application specific security (e.g., JSON Web Encryption (JWE)). Other security settings include the cryptographic algorithms supported and access control policies (e.g., access control lists (ACLs)). Security settings may also include device and platform capabilities such as existence of a clock, secure time, random number generator, manufacturer certificate, etc. In some cases, additional security attribute information to be analyzed by SIRE 126 may include key strength for encryption and/or making keys, hash algorithm strength, device hardening criteria applied (e.g., common criteria, FIPS, etc.), and existence of audiovisual and security telemetry monitoring. In some embodiments policies may prescribe equivalences for acceptable matches. For example, an AES128-bit key may have equivalent strength as an Elliptic-Curve ECDSA 256-bit key. Other equivalents may be AES128 and Blowfish128. Though they are different algorithms, a policy could set them equal for purposes of the interoperability analysis described herein. Policies may also include ACL entries that explicitly grant/deny access. Hence the method for policy-defined isolation may use ACLs to enforce the isolation (rather than replacing an encryption key or algorithm that otherwise could cause the isolation).

As further illustrated in FIG. 2, SRIM 120 also includes a dynamic provisioning engine 128. Provisioning engine 128 may, responsive to recommendations generated by SIRE 126, perform appropriate reconfiguration and/or provisioning of IoT devices 110. To this end, provisioning engine 128 may be configured to communicate instructions and/or configuration information (or other provisioning information) to one or more IoT devices 110 to enable a reboot, re-initialization and/or a roll back of a given device. In this way, one or more devices 110 may be re-configured, e.g., for communication with one or more other IoT devices 110 by a different channel and/or transport protocol to enable interoperability between such devices at an appropriate security level. Thus as illustrated in FIG. 2, SRIM 120 communicates a recommendation to device $110_2$ to enable its reconfiguration by way of updated channel/transport protocol to be compatible (from a security interoperability point of view) with device $110_1$. Understand while shown at this high level in the embodiment of FIG. 2, many variations and alternatives are present.

Figure 3:
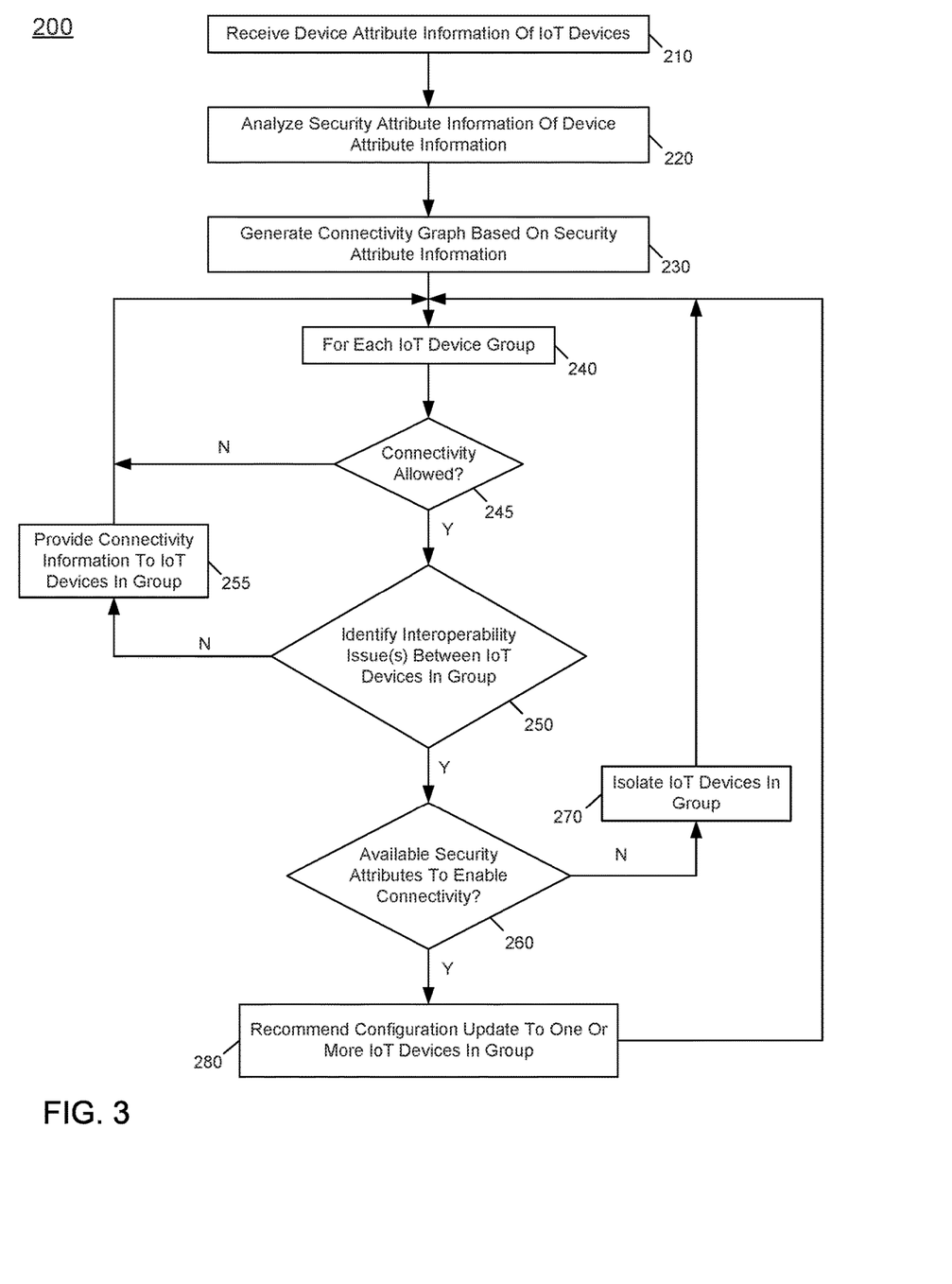
FIG. 3 is a flow diagram of a security configuration method in accordance with an embodiment of the present invention.

Referring now to FIG. 3, shown is a flow diagram of a security configuration method in accordance with an embodiment of the present invention. As shown in FIG. 3, method 200 may be performed by a SRIM and its constituent components. Method 200 shown in FIG. 3 is with regard to a centralized implementation of a SRIM that may access various IoT devices within an IoT network for discovery of security attribute information and perform any appropriate configuration/provision based thereon. In other embodiments, a distributed SRIM may be provided, and various modifications to method 200 may occur to enable proper distributed operation of the method.

As illustrated in FIG. 3, method 200 begins by receiving device attribute information of IoT devices within an IoT network (block 210). A wide variety of device attribute information may be received. Understand that in different implementations, this information may be received responsive to requests made from the SRIM to the IoT devices. In other cases, a query of a directory service may be performed to obtain this information. At block 220, security attribute information of the device attribute information can be analyzed. As discussed, a wide variety of security attribute information can be considered to determine various security objectives and capabilities of the different devices. Still referring to FIG. 3, next a connectivity graph can be generated based on the security attribute information (block 230). Details of such connectivity graphs are described further below. Suffice to say, these connectivity graphs can be used to identify connection capabilities between the different devices at corresponding security levels.

After such connectivity graphs or other analysis is completed, control passes to block 240 where a loop of operations may begin for each device group. That is, the IoT devices within the IoT network can be grouped into corresponding collections of devices (e.g., pairs or greater than two devices per group). Understand also that a given device may be placed into multiple groups, such that interoperability between two devices within different groups may occur, e.g., on different channels/transport protocols. For a given group, analysis may determine whether connectivity is allowed between the devices (diamond 245). This determination may be based on security attribute information or other such information that indicates that certain devices are to be restricted from interaction with other devices. If no connectivity is allowed, no further analysis occurs for that group. If instead it is determined that connectivity is allowed, control passes to diamond 250 to identify any interoperability issues (if any) between IoT devices in the group. If no such issues are identified, control passes to block 255 where connectivity information may be provided to these devices. For example, a connectivity message can be sent from the SRIM to the devices to identify appropriate channels/transport protocols on which to communicate, device addressing information, encryption/decryption schemes to be used and so forth.

Still with reference to FIG. 3, instead if an interoperability issue is identified, control passes to diamond 260 to determine whether there are available security attributes to enable connectivity. This determination may be based, at least in part, on capability information of the devices, to determine whether there is some common mechanism with which the devices may communicate and remain within the security requirements of the given devices/groups/network. If this is the case, control next passes to block 280 where a configuration update recommendation may be generated and provided to one or more of the IoT devices in a group. Each device and layer will produce a list of security attributes that typify its security profile. An inference engine can be used to construct a model that relates each device/layer module (e.g., 112) to every other module. Similar modules are grouped more closely while dissimilar modules are grouped further apart. A similar analysis can be applied to a theoretical security capability based on alternative configurations for the device. For example, a device might be configured with a 128-bit key but is capable of performing 256-bit cryptography. A model can be found that shows the alternative security configurations of module 112 possible given its hardware constraints and update capability. The recommendation engine may then find a set of possible security configurations for each module (e.g., 112-1, 112-2, . . . 116-1, 116-2, . . . etc.) that allows the expected device connectivity. The result is a recommendation regarding configuration changes resulting in stronger security. A recommendation could further include a notification to an administrator regarding devices to be replaced in order to achieve a desired security level.

Understand that in some cases, the SRIM may act as a centralized controller and the IoT devices within the network comply with these recommendation messages. In other cases, particularly in a distributed environment, a given IoT device may choose not to accept any such recommendation and not make any corresponding changes. Recommendations may be optional pending approval of an authorized decision maker such as a site administrator, in an embodiment. Note that given a high degree of automation of the update facility, some of the decision making can be automated as well. For example, a software update that implements stronger security features could be automatically made and applied.

Note that if there are no available security attributes to enable connectivity between the devices, control instead passes from diamond 260 to block 270, where the IoT devices in the group may be isolated from each other. Such isolation may occur where one or more of the devices lacks hardware or other component to enable interaction at a required security level. Understand while shown at this high level in the embodiment of FIG. 3, many variations and alternatives are possible.

The SIRE may use a directory of device discovery information to evaluate all the devices that are reachable/isolated to the local device. A distributed SIRE interface may be used with inference to identify individual and collections of devices that are isolated from the other devices in the IoT network due to lack of interoperable security settings. Inference may result in one or more graphs (such as discussed in FIGS. 5 and 6) showing various IoT network topologies based on security interoperability possibilities. Edges of these graphs show the security settings that allow connectivity. Topology graph information may be further analyzed by a network management tool to determine whether security is to be downgraded incrementally across multiple graph nodes.

A device security abstraction layer may be used to ensure that the SIRE can consistently access OS and device specific security capabilities. It also relies on the IoT framework resource model for presenting security settings and capabilities consistently to a discovery mechanism such as multi-cast discovery or a centralized directory.

Figure 4:
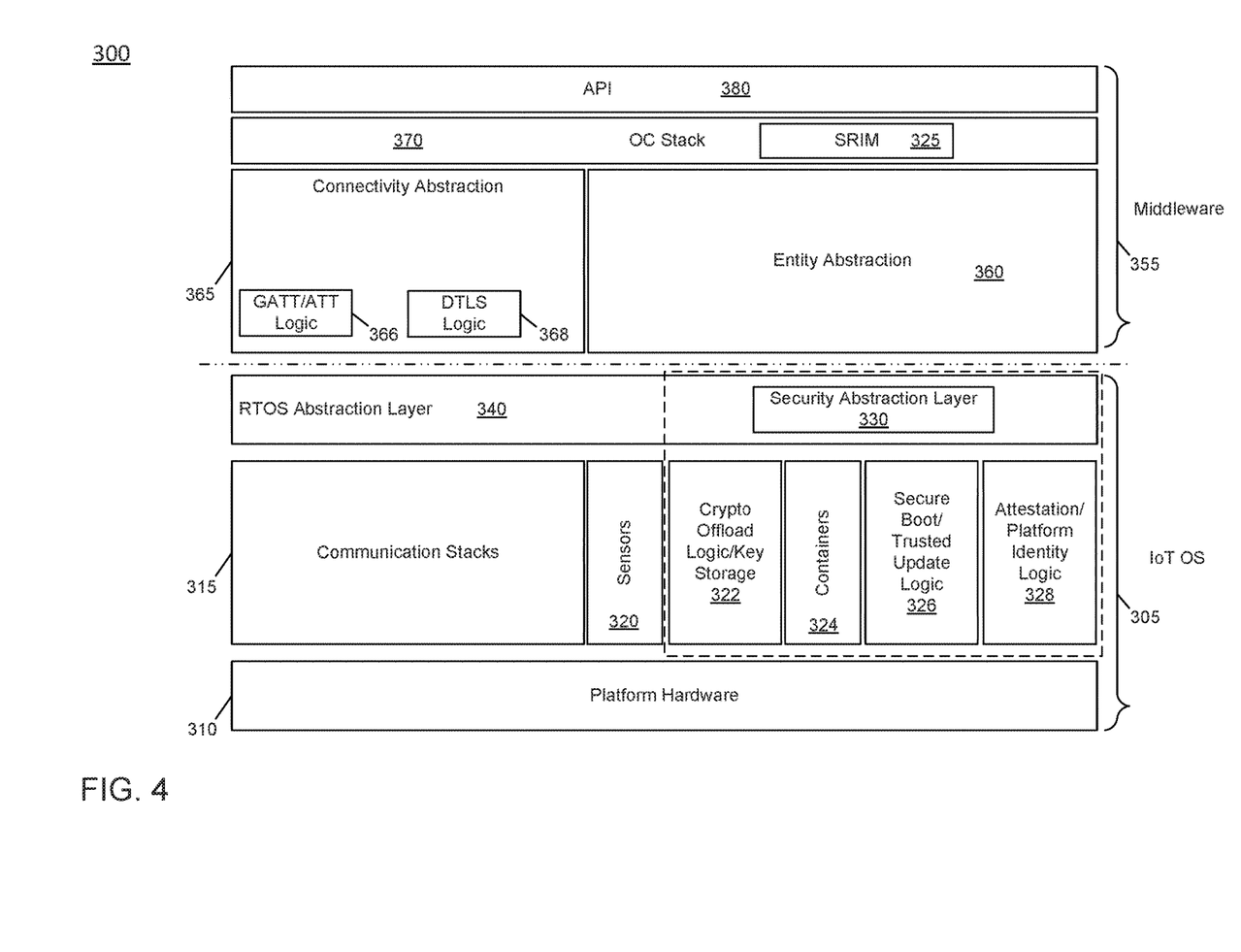
FIG. 4 is a block diagram of an IoT platform in accordance with an embodiment.

Referring now to FIG. 4, shown is a block diagram of a representative IoT device having distributed security logic in accordance with an embodiment of the present invention. As shown in FIG. 4, IoT device 300 may be a representative IoT device having platform hardware 310. In various embodiments, platform hardware 310 may include, at a minimum some type of processing capability such as CPU, microcontroller or so forth, storage such as one or more volatile or non-volatile memories, and communication capabilities (such as according to one or more wireless protocols). An IoT operating system (OS) 305 may execute on platform hardware 310. Such OS may leverage a runtime OS (RTOS) abstraction layer 340 and a security abstraction layer 330. As seen, RTOS abstraction layer 340 may leverage one or more communication stacks 315, which may provide appropriate firmware and/or software for implementing one or more communication protocols. In addition, RTOS abstraction layer 340 interacts with hardware sensors 320. For purposes of abstracting underlying hardware, software and/or firmware for security operations, security abstraction layer 330 may interface with cryptographic offload logic/key storage 322, one or more containers 324 that provide for isolated execution of security operations, a secure boot/trusted update logic 326, and an attestation/platform identity logic 328. Security abstraction layer 330 may thus discover this local security functionality. External device security information can be obtained using communication stack 315 to an IoT device discovery mechanism.

To enable communication of security attribute information regarding this underlying hardware, software and/or firmware, security abstraction layer 330 may interact, via an entity abstraction 360 of a middleware 355, with a distributed SRIM 325, which itself may be part of an OIC-compatible stack 370. As further illustrated, SRIM 325 may further interact with connectivity abstraction 365 under which communication stacks 315 execute. As illustrated, connectivity abstraction 365 includes a generic attribute profile/attribute profile logic (GATT/ATT) 366 and a DTLS logic 368. As further illustrated, middleware 355 may provide an application programming interface 380. Understand while shown at this high level in the embodiment of FIG. 4, many variations and alternatives are possible. Further, note that while FIG. 4 shows logically where a SRIM in accordance with an embodiment may be integrated into an IoT framework, other implementations are possible. Also while FIG. 4 shows SRIM 325 as implemented within an IoT framework, in other cases at least portions may be implemented as an application or service on top of an IoT framework.

Figure 5:
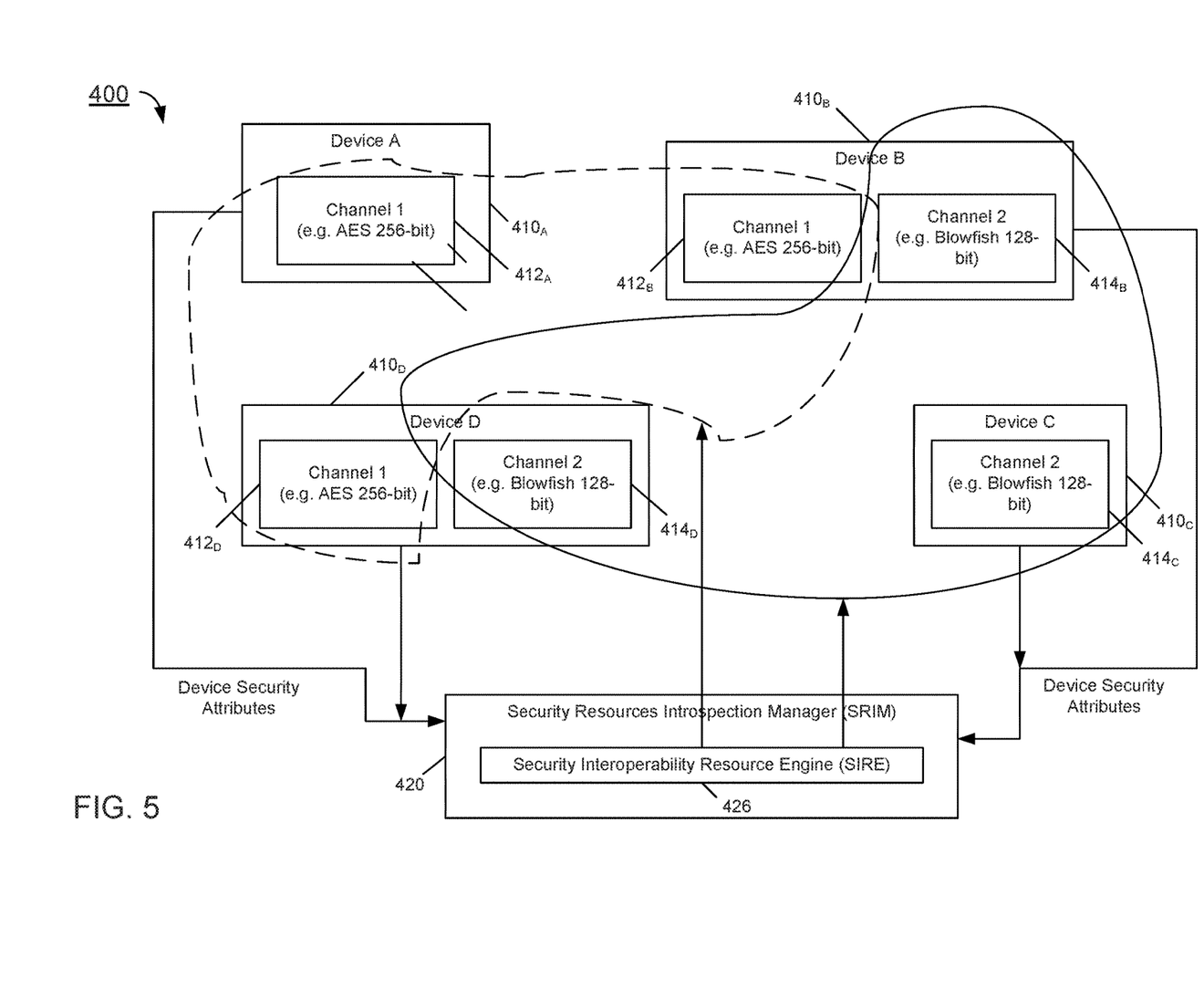
FIG. 5 illustrates a connectivity graph in accordance with an embodiment of the present invention.

FIG. 5 illustrates a connectivity graph that can be built by an inference engine in accordance with an embodiment of the present invention. Graph connectivity may be based on security attributes, as discussed above. As illustrated in FIG. 5, IoT network 400 includes a plurality of IoT devices $410_A$-$410_D$ (also referred to herein as devices A-D). The devices in turn include one or more channels, namely first channels $412_{A, B}$ and $_D$ and second channels $414_{B, C}$ and $_D$. In addition, IoT network 400 includes a SRIM 420 including an integrated SIRE 426. Understand that while shown at this high level, SRIM 420 may be configured with additional modules such as discussed above in FIG. 2. As illustrated, the connectivity graph identifies different groupings of IoT devices based on security attributes. With specific reference to FIG. 5, assume that first channels 412 communicate via a particular communication channel/transport protocol that can implement 256-bit Advanced Encryption Standard (AES) encryption, while instead second channel 412 may be configured to communicate using 128-bit Blowfish-based encryption techniques.

Based on the security attributes exposed by IoT devices 410, inference engine 426 may identify interoperability issues and group the devices into different groups (e.g., Group 1 with channel 1 support and Group 2 with channel 2 support). For Device A that is in a different group than Device C, SRIM 420 can provide a recommendation to Device A to bring up channel 2 support securely by rolling back/re-provisioning/etc., so it can communicate directly with device C. In the case where device A wants to communicate to Device C without any provisioning (i.e., no device state change) in its channels, it may have to go through a broker.

Figure 6:
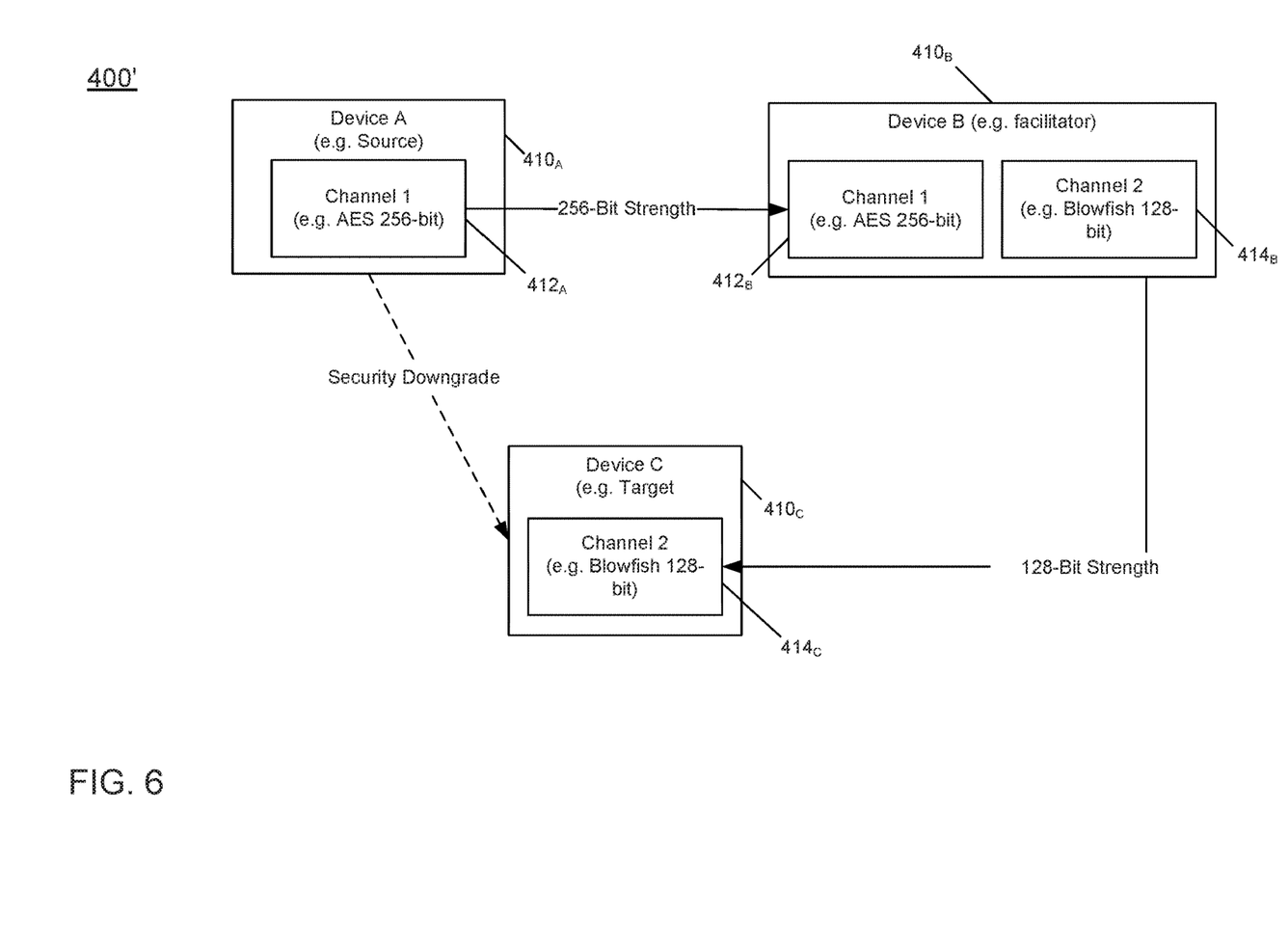
FIG. 6 illustrates a connectivity graph in accordance with an embodiment of the present invention.

Thus as illustrated in the network interaction of FIG. 6, network 400' has a security downgrade situation between devices 410$_A$ and 410$_C$, given that device 410$_A$ is configured for channel 1 support to communicate according to 256-bit AES-based encryption, while instead device 410$_C$ is configured to communicate with channel 2 configuration according to 128-bit Blowfish-based encryption. To this end, a broker or other intermediary may be present within IoT network 400' to enable interaction between these devices, with a degradation of security levels as shown in FIG. 6 (256-128 bit) or vice-versa. Otherwise, these devices may be isolated from each other. Implied in the detection of downgrade/escalation in a network path is the potential for security events. It is a security analyst's decision to attempt to correct it through reconfiguration, recognizing that doing so may result in increased isolation within the network. A recommendation engine, such as a SRIM, may be configured to identify possible alternative configurations to optimize both connectivity and security.

Thus FIG. 6 illustrates this security downgrade scenario where a security interoperability attribute based on cryptographic strength between Device A and Device B differs from a cryptographic strength between Device B and Device C. Applying a transitivity property reveals a potential security downgrade scenario between Devices A and C. SIRE 426 (of FIG. 5) may be used to detect desirable and undesirable security conditions within an IoT network beyond the first objective of finding interoperability gaps.

Understand that a connectivity graph as in FIG. 5 or 6 may be used to provide reporting of security interoperability (and/or interoperability issues) between given IoT devices to a network administrator, e.g., via a network authoring tool, in some embodiments. Responsive to this information, automatically or under control of the network administrator, various reconfiguration operations (separate and apart from recommendations provided by a SRIM as described herein) may be performed to enable appropriate security inoperability between devices. In other cases, to ensure that devices being identified as security incompatible are maintained that way, a network administrator and/or network authoring tool may generate one or more ACLs and provision such ACLs in association with the IoT devices to prevent interaction. Still further, understand that IoT devices may dynamically enter and exit from an IoT network environment. In such cases, a SRIM or other security module of the devices themselves may be configured to erase various security credentials when a device exits the network. Understand that a network administrator may have further interactions with IoT devices and/or a SRIM in other embodiments.

Various embodiments provide a number of techniques and mechanisms, including but not limited to, SRIM incorporation into an IoT framework (such as OIC) security layer having a SIRE that makes use of an IoT discovery mechanism to discover security attributes that may be platform specific, network specific, device specific and application specific. In turn, the SIRE may evaluate security attributes capabilities of a local device and a target recipient device. An inference engine may build the directory graph of connectivity for the given IoT network using the security attributes retrieved from discovery management service. Such directory graph may be used to show various IoT network topologies based on security interoperability possibilities. A SIRE may provide appropriate recommendation (e.g., common channels/protocols) that can be used to establish a secure channel for establishing connection and negotiate secure channel/keys. The SIRE may use a directory of device discovery information to evaluate all the devices that are reachable/isolated to the local device. A distributed SIRE interface may be used with inference to identify individual and collections of devices that are isolated from the other devices in the IoT network due to lack of interoperable security settings. The SIRE may include a dynamic provisioning engine to bring up required modules in a secure path by dynamic provisioning (reboot/re-init/roll-back of device state) for efficient interoperability using SDN. The SIRE may allow an IoT device to exchange trusted boot measurements and verify that those measurements match with the discovery data exposed by directory. In an embodiment, a security directory service can be a trusted entity, thereby devices do not have to exchange trusted boot measurements. The security directory service may allow a higher trust level entity to update the discovery data of a lower trust level entity.

A device security abstraction layer may be used to ensure the SIRE module can consistently access OS and device specific security capabilities. It also relies on the IoT framework resource model for presenting security settings and capabilities consistently to a discovery mechanism such as multi-cast discovery or a centralized directory. The SRIM or at least portions of it (e.g., SIRE) may be implemented in a TEE or other hardened IoT environment such as a platform TEE that may including hardware, firmware, virtualization and OS process isolation/security hardening primitives, etc. Embodiments thus provide an IoT device discovery mechanism to obtain security attribute information as an input to a security interoperability analysis engine.

Figure 7:
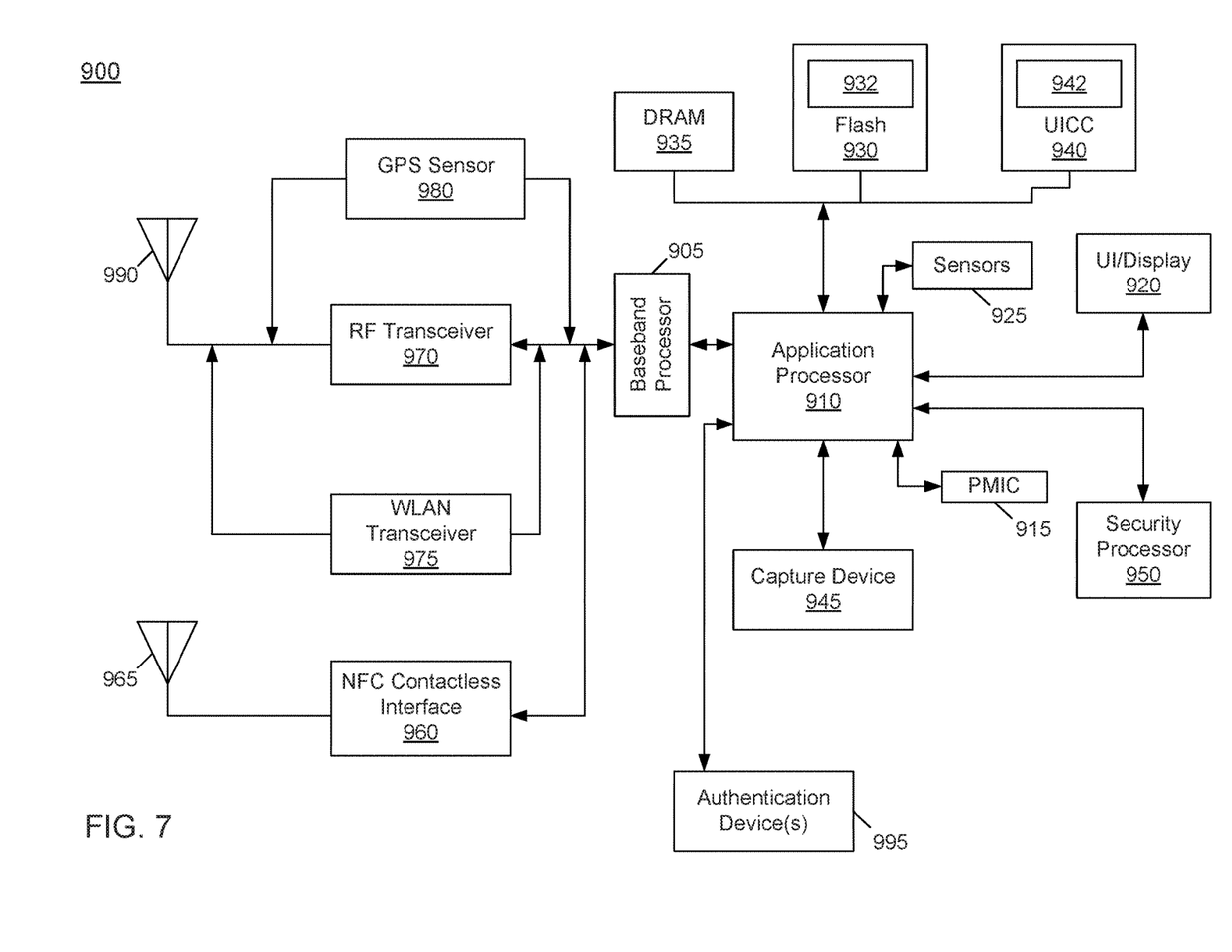
FIG. 7 is a block diagram of an example system with which embodiments can be used.

Referring now to FIG. 7, shown is a block diagram of an example system with which embodiments can be used. As seen, system 900 may be a smartphone or other wireless communicator or any other IoT device. System 900 may implement security interoperability-based updates according to a recommendation provided by a SRIM as described herein. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 7, a universal integrated circuit card (UICC) 940 comprises a subscriber identity module, which in some embodiments includes a secure storage 942 to store secure user information. System 900 may further include a security processor 950 that may may implement a trusted execution environment (TEE), and which may couple to application processor 910. Furthermore, application processor 910 may implement a secure mode of operation, such as Intel® SGX to a given instruction set architecture, and circuitry for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 7, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 8:
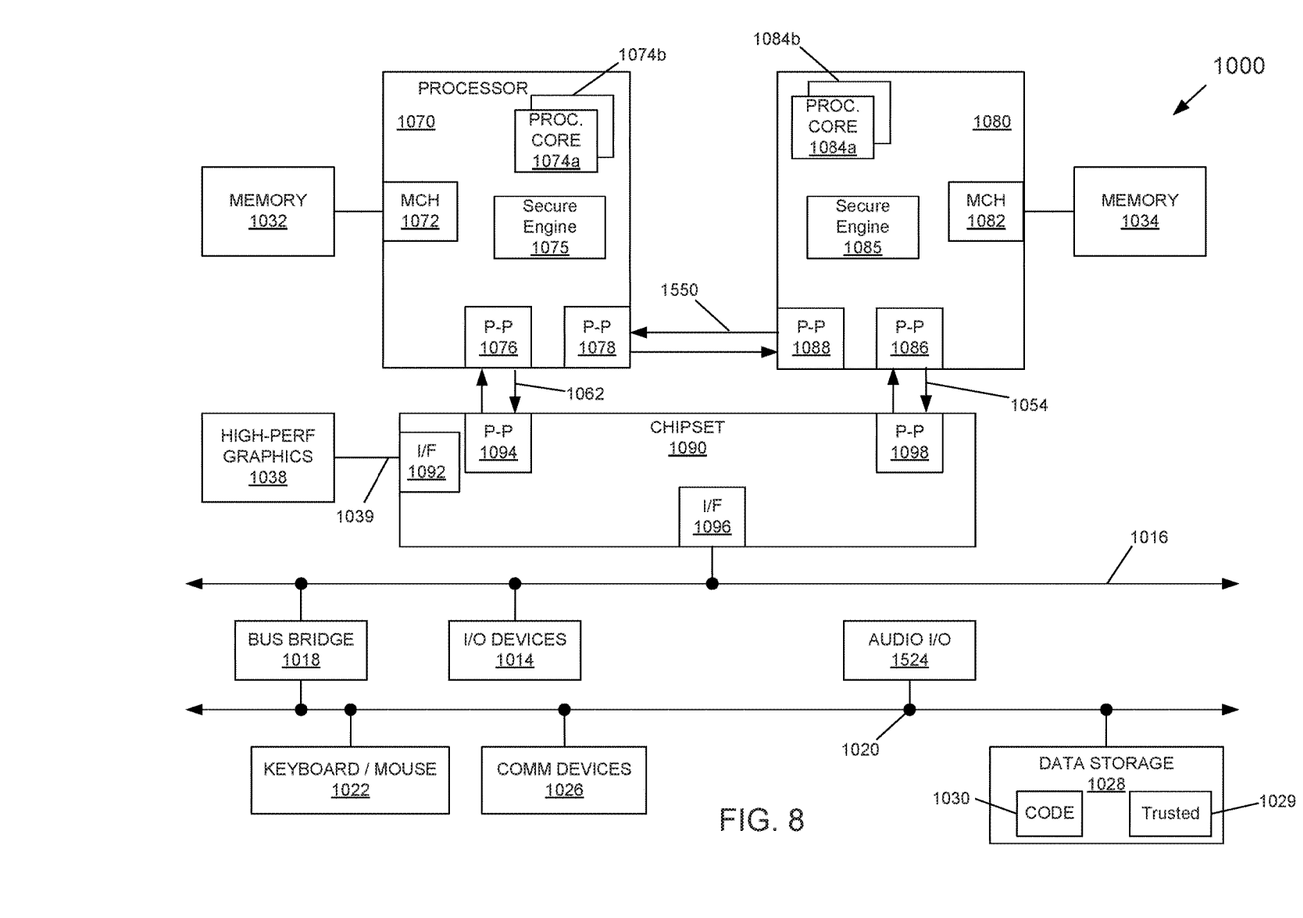
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 1000 is a point-to-point interconnect system such as a server system, and includes a first processor 1070 and a second processor 1080 coupled via a point-to-point interconnect 1050. As shown in FIG. 8, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth, and provide a SRIM as described herein.

Still referring to FIG. 8, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 8, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 8, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 8, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 9:
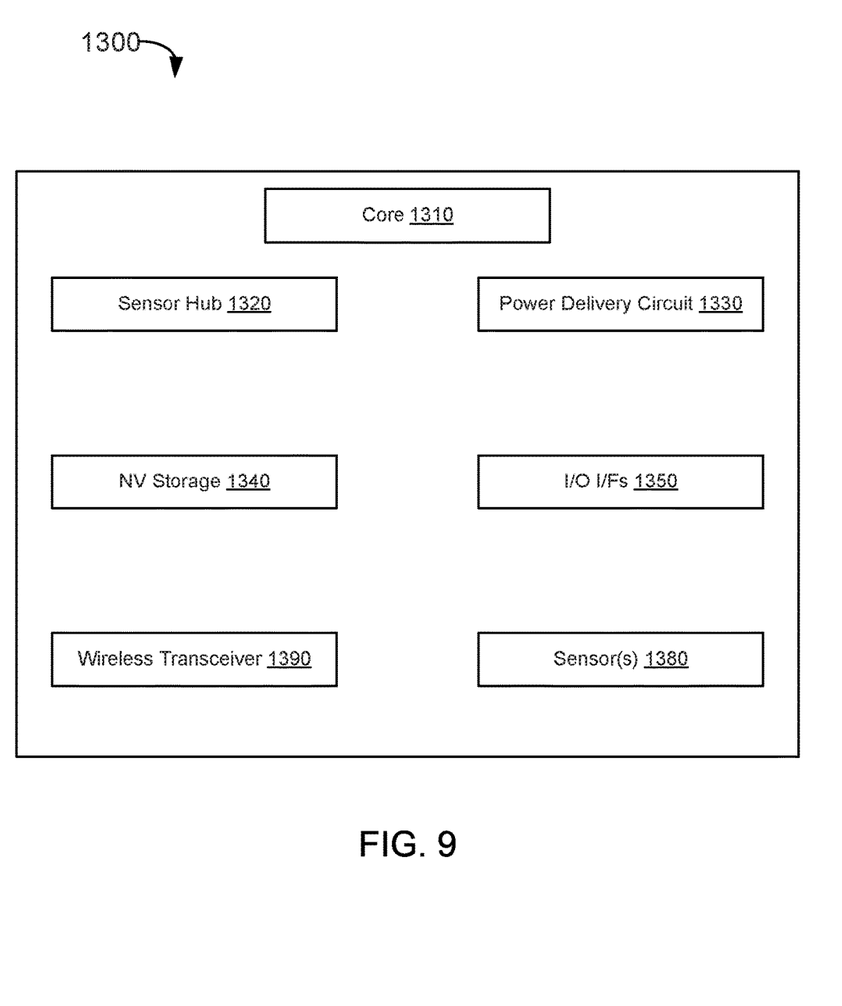
FIG. 9 is a block diagram of a system in accordance with another embodiment of the present invention.

Embodiments may be used in environments where IoT devices may include wearable devices or other small form factor IoT devices. Referring now to FIG. 9, shown is a block diagram of a wearable module 1300 in accordance with another embodiment. In one particular implementation, module 1300 may be an Intel® Curie™ module that includes multiple components adapted within a single small module that can be implemented as all or part of a wearable device. Module 1300 may implement security interoperability-based updates according to a recommendation provided by a SRIM as described herein. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

The following Examples pertain to further embodiments.

In Example 1, an apparatus comprises: a first logic to receive device attribute information from a plurality of devices of a network, the first logic to analyze security attribute information of the device attribute information and generate a connectivity graph of the plurality of devices based at least in part on the security attribute information and identify an interoperability issue between a first device and a second device based on the connectivity graph; a second logic to generate a recommendation to resolve the interoperability issue; and a third logic to provide provisioning information to at least one of the first device and the second device based on the recommendation.

In Example 2, the recommendation comprises at least one of a communication channel and a transport protocol to enable the first device and the second device to establish a secure communication path.

In Example 3, the apparatus of Example 1 comprises a SRIM to execute in a distributed manner across at least some of the plurality of devices.

In Example 4, the apparatus of Example 3 comprises a security abstraction layer having the SRIM.

In Example 5, the apparatus of Examples 1 or 2 comprises a central controller of the network to execute on one or more computing platforms.

In Example 6, the one or more computing platforms of Example 5 comprises a TEE to execute in an isolated environment, the second logic to execute at least in part in the TEE.

In Example 7, the second logic is to identify whether a third device to be incorporated into the network would realize a path to a sub-graph of the connectivity graph, the sub-graph to be isolated from other devices.

In Example 8, the second logic is to enable the first device to form a secure communication path to the second device via a first common communication channel and a first common transport protocol, the first common communication channel and the first common transport protocol having a greater security capability than a second common communication channel and a second common transport protocol.

In Example 9, the second logic is to receive a trusted boot measurement from the first device and compare information of the trusted boot measurement with the device attribute information.

In Example 10, the second logic is to identify a third device to be isolated from at least a fourth device, based on the connectivity graph and the security attribute information.

In Example 11, the second logic is to group a first portion of the plurality of devices into a first group based on the security attribute information and to group a second portion of the plurality of devices into a second group based on the security attribute information, where at least one device is to be grouped in the first group and the second group.

In Example 12, a method comprises: analyzing, in a security engine of a network, security attribute information of a plurality of devices of the network; identifying, in the security engine, at least one interoperability issue between a first device and a second device of the network; and providing, from the security engine, a recommendation to at least one of the first device and the second device for a configuration update to enable the first and second devices to be interoperable at a first security level.

In Example 13, the method further comprises receiving the security attribute information in device attribute information of the plurality of devices.

In Example 14, the method further comprises generating a connectivity graph of the network based at least in part on the security attribute information.

In Example 15, the method further comprises identifying the at least one interoperability issue based at least in part on the connectivity graph.

In Example 16, the method further comprises isolating a third device from a fourth device of the network based at least in part on the connectivity graph.

In Example 17, the recommendation comprises at least one of an updated channel and an updated transport protocol, where at least one of the updated channel and the updated transport protocol is not native to at least one of the first device and the second device.

In Example 18, the method further comprises causing the at least one of the first device and the second device to be provisioned for the at least one of the updated channel and the updated transport protocol.

In another Example, a computer readable medium including instructions is to perform the method of any of the above Examples.

In another Example, a computer readable medium including data is to be used by at least one machine to fabricate at least one integrated circuit to perform the method of any one of the above Examples.

In Example 19, a system comprises: a plurality of devices, each of the plurality of devices including at least one channel and at least one transport protocol; and a controller coupled to the plurality of devices, the controller including a security logic to receive security attribute information of the plurality of devices, analyze the security attribute information, identify an interoperability issue between a first device and a second device based at least in part on the analyzed security attribute information, generate a recommendation to resolve the interoperability issue, and provide provisioning information to at least one of the first device and the second device based on the recommendation.

In Example 20, the security logic is to communicate an isolation of a third device from a fourth device to a network authoring tool, the network authoring tool to generate an access control policy to prevent interaction between the third device and the fourth device.

In Example 21, the recommendation comprises at least one of an updated channel and an updated transport protocol, where at least one of the updated channel and the updated transport protocol is not native to at least one of the first device and the second device.

In Example 22, the first device comprises a security abstraction layer to provide the security attribute information to the controller, the security attribute information including channel and transport protocol information.

In Example 23, an apparatus comprises: means for receiving device attribute information from a plurality of devices of a network, including means for analyzing security attribute information of the device attribute information and generating a connectivity graph of the plurality of devices based at least in part on the security attribute information and identifying an interoperability issue between a first device and a second device based on the connectivity graph; means for generating a recommendation to resolve the interoperability issue; and means for providing provisioning information to at least one of the first device and the second device based on the recommendation.

In Example 24, the recommendation comprises at least one of a communication channel and a transport protocol to enable the first device and the second device to establish a secure communication path.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first logic to receive device attribute information from a plurality of devices of a network, the first logic to analyze security attribute information of the device attribute information and generate a connectivity graph of the plurality of devices based at least in part on the security attribute information and identify an interoperability issue between a first device and a second device based on the connectivity graph;
a second logic to generate a recommendation to resolve the interoperability issue; and
a third logic to provide provisioning information to at least one of the first device and the second device based on the recommendation.

2. The apparatus of claim 1, wherein the recommendation comprises at least one of a communication channel and a transport protocol to enable the first device and the second device to establish a secure communication path.

3. The apparatus of claim 1, wherein the apparatus comprises a security resource introspection manager (SRIM), the SRIM to execute in a distributed manner across at least some of the plurality of devices.

4. The apparatus of claim 3, wherein the apparatus comprises a security abstraction layer having the SRIM.

5. The apparatus of claim 1, wherein the apparatus comprises a central controller of the network to execute on one or more computing platforms.

6. The apparatus of claim 5, wherein the one or more computing platforms comprises a trusted execution environment (TEE) to execute in an isolated environment, the second logic to execute at least in part in the TEE.

7. The apparatus of claim 1, wherein the second logic is to identify whether a third device to be incorporated into the network would realize a path to a sub-graph of the connectivity graph, the sub-graph to be isolated from other devices.

8. The apparatus of claim 1, wherein the second logic is to enable the first device to form a secure communication path to the second device via a first common communication channel and a first common transport protocol, the first common communication channel and the first common transport protocol having a greater security capability than a second common communication channel and a second common transport protocol.

9. The apparatus of claim 1, wherein the second logic is to receive a trusted boot measurement from the first device and compare information of the trusted boot measurement with the device attribute information.

10. The apparatus of claim 1, wherein the second logic is to identify a third device to be isolated from at least a fourth device, based on the connectivity graph and the security attribute information.

11. The apparatus of claim 1, wherein the second logic is to group a first portion of the plurality of devices into a first group based on the security attribute information and to group a second portion of the plurality of devices into a second group based on the security attribute information, wherein at least one device is to be grouped in the first group and the second group.

12. At least one non-transitory computer readable storage medium comprising instructions that when executed enable a system to:
analyze, in a security engine of a network, security attribute information of a plurality of devices of the network and generate a connectivity graph of the network based at least in part on the security attribute information;
identify, in the security engine, at least one interoperability issue between a first device and a second device of the network; and
provide, from the security engine, a recommendation to at least one of the first device and the second device for a configuration update to enable the first and second devices to be interoperable at a first security level.

13. The at least one non-transitory computer readable storage medium of claim 12, further comprising instructions that when executed enable the security engine to identify the at least one interoperability issue based at least in part on the connectivity graph.

14. The at least one non-transitory computer readable storage medium of claim 12, further comprising instructions that when executed enable the security engine to isolate a third device from a fourth device of the network based at least in part on the connectivity graph.

15. The at least one non-transitory computer readable storage medium of claim 12, wherein the recommendation comprises at least one of an updated channel and an updated transport protocol, where at least one of the updated channel and the updated transport protocol is not native to at least one of the first device and the second device.

16. The at least one non-transitory computer readable storage medium of claim 15, further comprising instructions that when executed enable the security engine to cause the at least one of the first device and the second device to be provisioned for the at least one of the updated channel and the updated transport protocol.

17. A system comprising:
a plurality of devices, each of the plurality of devices including at least one channel and at least one transport protocol; and
a controller coupled to the plurality of devices, the controller including a security logic to receive security attribute information of the plurality of devices, analyze the security attribute information, identify an interoperability issue between a first device and a second device based at least in part on the analyzed security attribute information, generate a recommendation to resolve the interoperability issue, and provide provisioning information to at least one of the first device and the second device based on the recommendation.

18. The system of claim 17, wherein the security logic is to communicate an isolation of a third device from a fourth device to a network authoring tool, the network authoring tool to generate an access control policy to prevent interaction between the third device and the fourth device.

19. The system of claim 17, wherein the recommendation comprises at least one of an updated channel and an updated transport protocol, where at least one of the updated channel and the updated transport protocol is not native to at least one of the first device and the second device.

20. The system of claim 17, wherein the first device comprises a security abstraction layer to provide the security attribute information to the controller, the security attribute information including channel and transport protocol information.

21. The system of claim 17, wherein the security logic is to generate a connectivity graph of a network including the plurality of devices based at least in part on the security attribute information.

22. The system of claim 21, wherein the security logic is to identify the at least one interoperability issue based at least in part on the connectivity graph.

* * * * *